(No Model.) 5 Sheets—Sheet 1.

S. H. EMMENS.
BREECH MECHANISM AND ATTACHMENTS FOR ORDNANCE.

No. 440,625. Patented Nov. 18, 1890.

Witnesses
H. A. Lamb
Lort Phillips

Inventor
STEPHEN HENRY EMMENS
By Thos. L. Ewin,
Attorney (No Model.) 5 Sheets—Sheet 2.
S. H. EMMENS.
BREECH MECHANISM AND ATTACHMENTS FOR ORDNANCE.
No. 440,625. Patented Nov. 18, 1890.
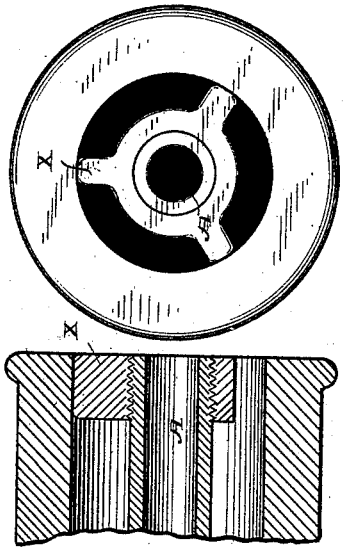
Fig. 2.ᵇ
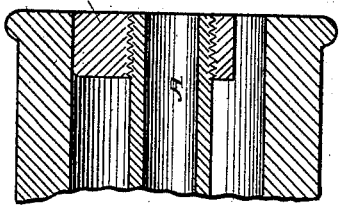
Fig. 2.ᵃ
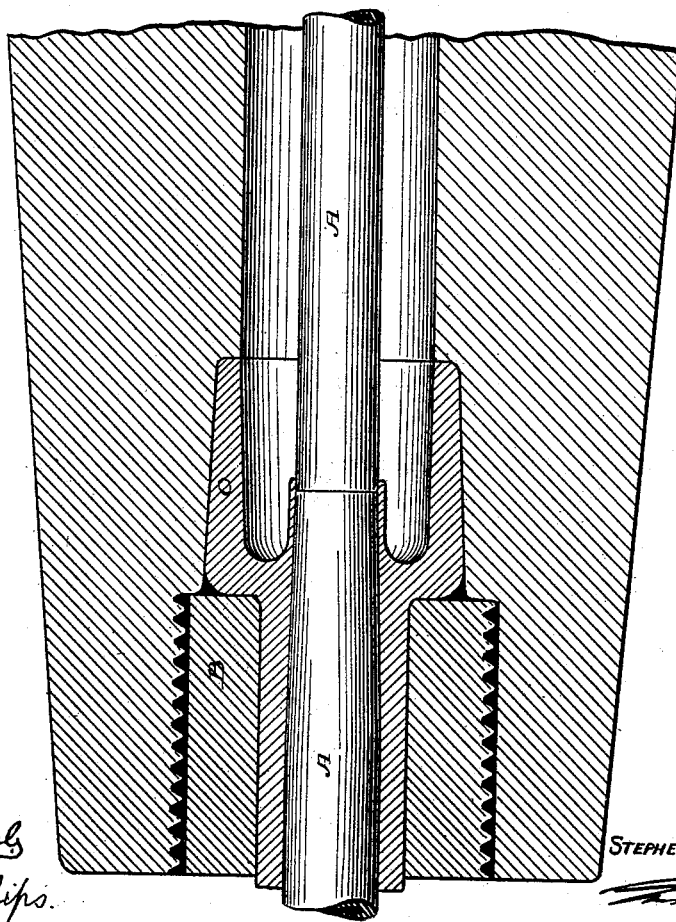
Fig. 2.
Witnesses
H. H. Lamb
Lost Phillips.
Inventor
STEPHEN HENRY EMMENS
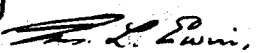
Attorney (No Model.) 5 Sheets—Sheet 3.
S. H. EMMENS.
BREECH MECHANISM AND ATTACHMENTS FOR ORDNANCE.
No. 440,625. Patented Nov. 18, 1890.
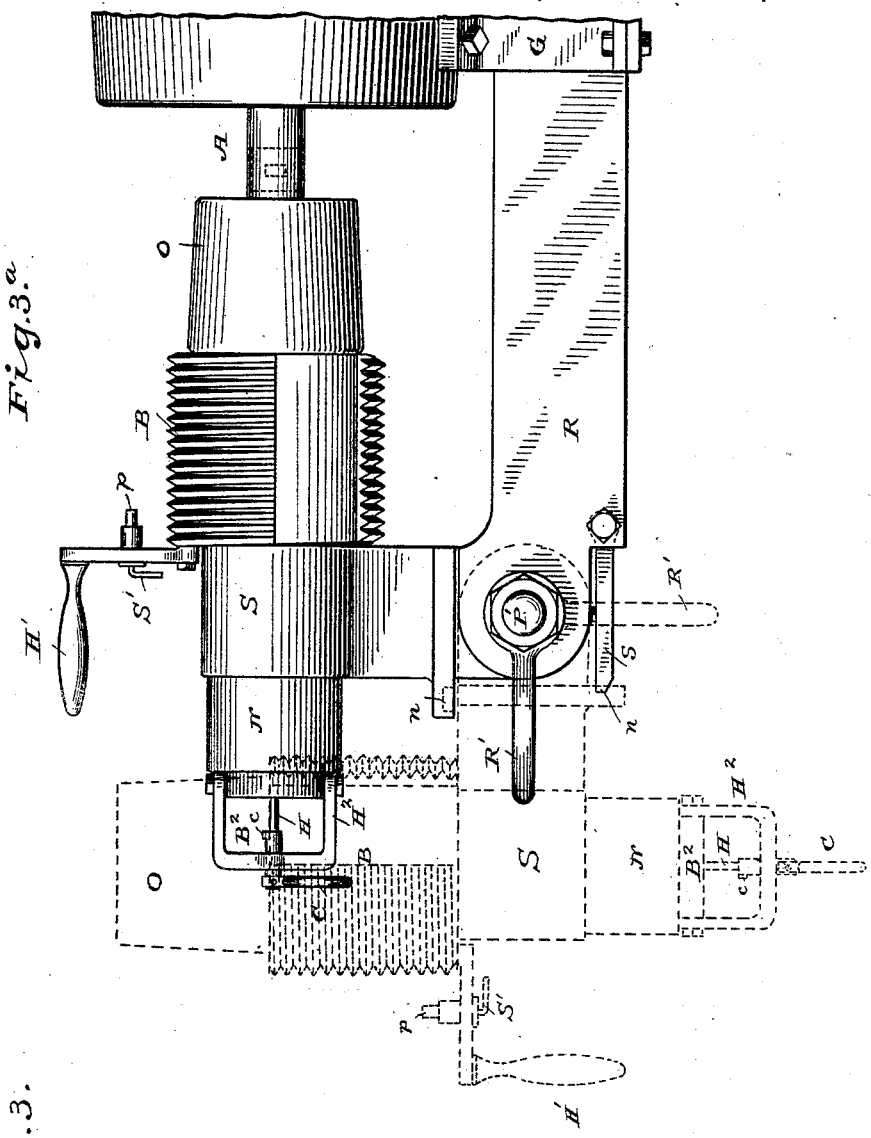
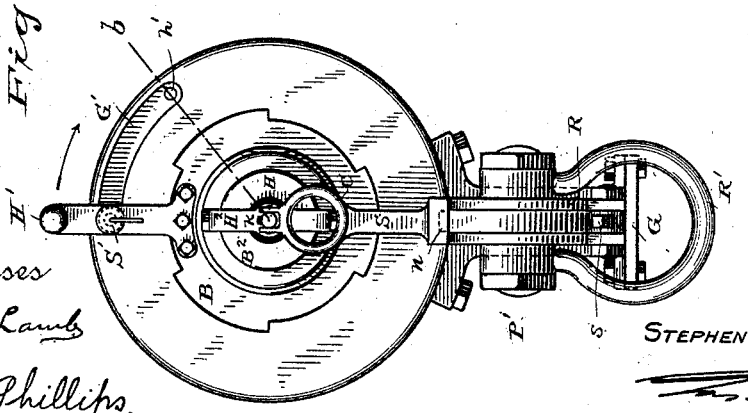
Witnesses
H. A. Lamb
Lort Phillips.
Inventor
STEPHEN HENRY EMMENS
Attorney (No Model.)
S. H. EMMENS.
BREECH MECHANISM AND ATTACHMENTS FOR ORDNANCE.
No. 440,625.
Patented Nov. 18, 1890.
5 Sheets—Sheet 4.
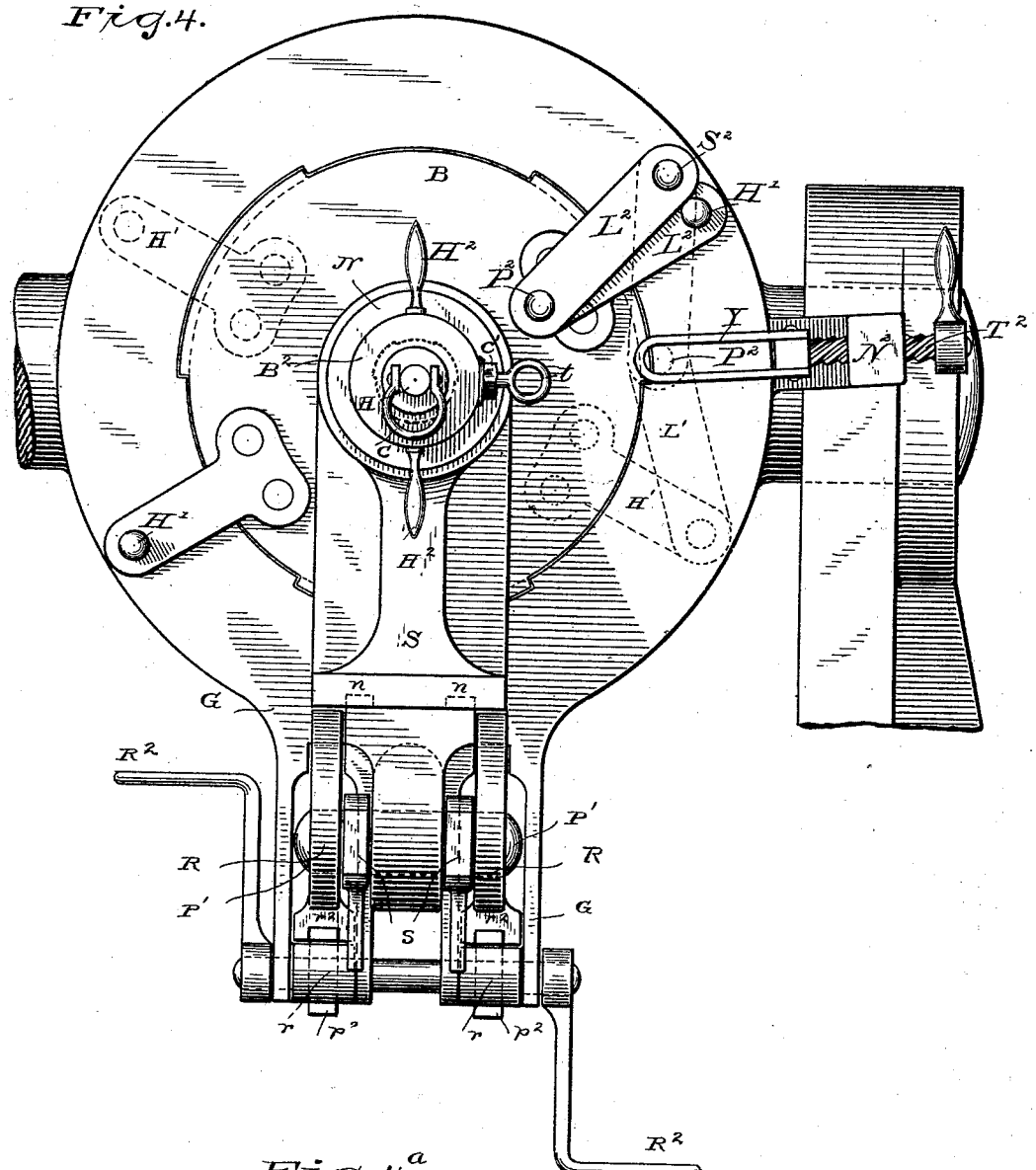
Witnesses
H. H. Lamb
Lort Phillips.
Inventor
STEPHEN HENRY EMMENS
Attorney (No Model.)

S. H. EMMENS.
BREECH MECHANISM AND ATTACHMENTS FOR ORDNANCE.

No. 440,625. Patented Nov. 18, 1890.

Witnesses
N. A. Lamb
Lort Phillips.

Inventor
STEPHEN HENRY EMMENS

Attorney

UNITED STATES PATENT OFFICE.

STEPHEN H. EMMENS, OF LONDON, ENGLAND.

BREECH MECHANISM AND ATTACHMENTS FOR ORDNANCE.

SPECIFICATION forming part of Letters Patent No. 440,625, dated November 18, 1890.

Application filed February 13, 1889. Serial No. 299,732. (No model.)

*To all whom it may concern:*

Be it known that I, STEPHEN HENRY EMMENS, a subject of the Queen of Great Britain and Ireland, and a resident of London, in England, temporarily residing at Harrison, in the State of New York, have invented a new and useful Improvement in Breech Mechanism and Attachments for Ordnance, of which the following is a specification.

The object of this invention is to provide a system of breech mechanism and attachments for ordnance which, while being of much simpler and cheaper construction than any hitherto employed, shall also afford effective means for preventing the escape of gas and smoke from the breech, and shall, furthermore, facilitate aiming-practice.

The invention consists in certain novel combinations of parts, hereinafter set forth and claimed.

Five sheets of drawings accompany this specification as part thereof.

Figures 1, 1X:
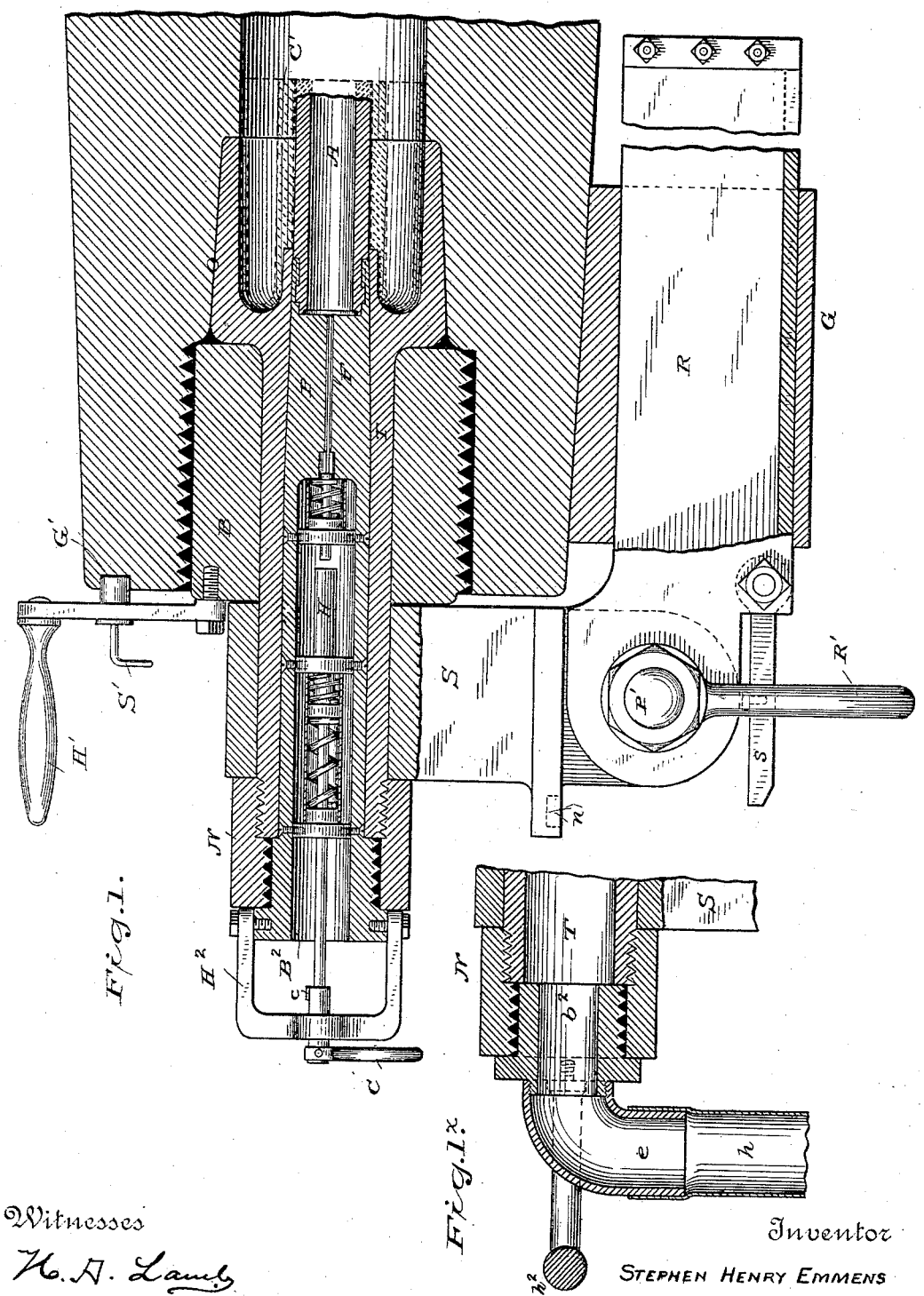
Figure 5:
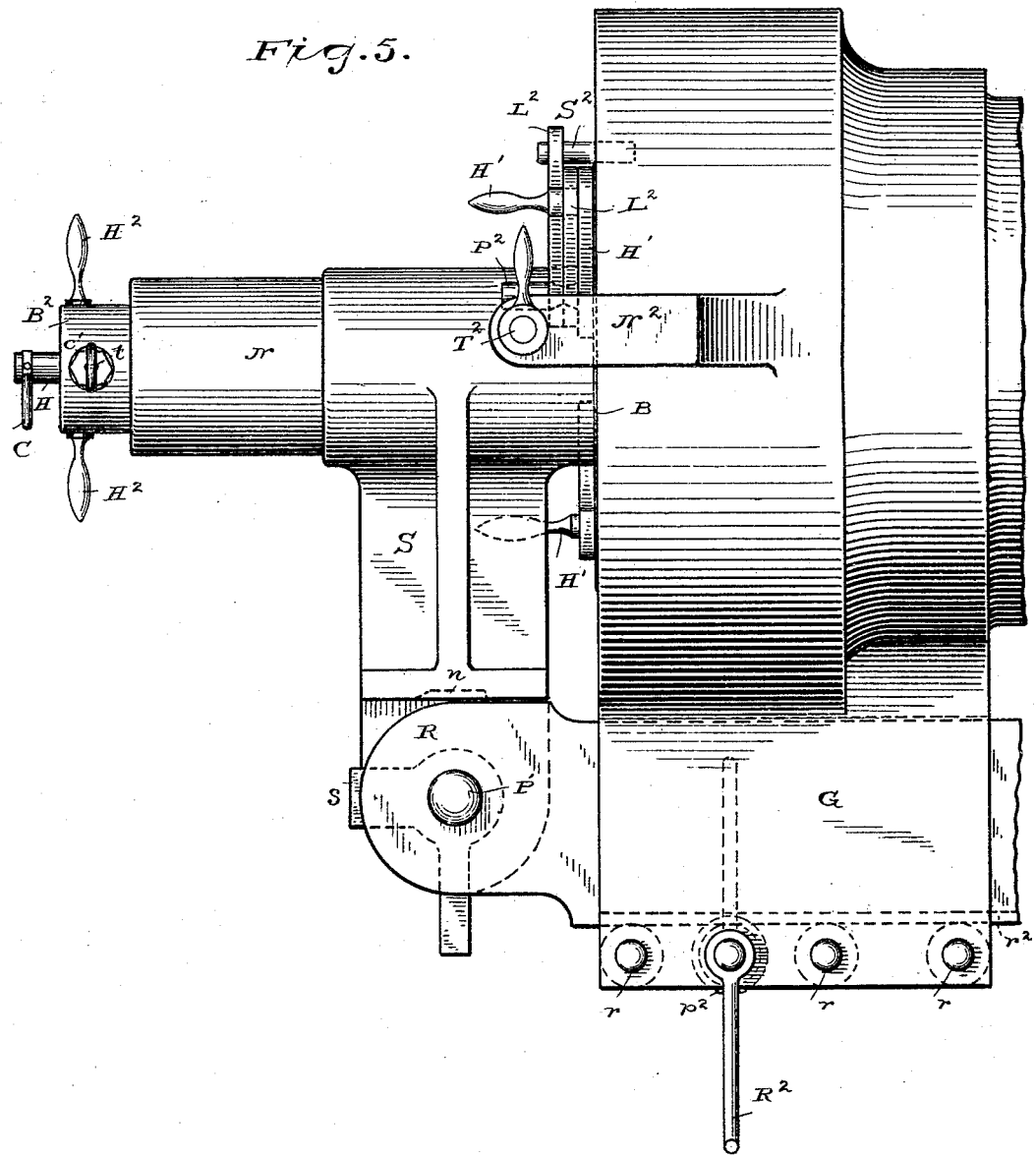

Figure 1 of the drawings represents a vertical axial section through the breech of a light gun provided with said breech mechanism and attachments, certain parts at and near the plane of section being shown in elevation. Fig. $1^\times$ represents a fragmentary section in the same plane through an air-hose attachment. Figs. 2 and $2^a$ represent axial sections; and Fig. $2^b$ a front end view showing a practice-barrel in position, as in full lines in Fig. 1. Fig. 3 is a rear end view illustrating the operations of closing and opening the breech. Fig. $3^a$ is a side elevation showing the breech mechanism in two retracted positions by full and dotted lines. Fig. 4 is a rear end view of a heavier gun, illustrating modifications of the breech mechanism. Fig. $4^a$ represents a cross-section through its trigger in a plane parallel to that of Fig. 4, and Fig. 5 is a side elevation of the breech mechanism last named.

Like letters of reference indicate corresponding parts in the several figures.

In each embodiment of my present invention the breech-block B is of the ordinary "interrupted-screw" type.

At the front end of the breech-block is an obturator O, which is cup-shaped and slightly beveled to fit a corresponding recess in the gun. The depth of this obturator is nearly equal to its smaller diameter, and it is thus adapted to support the breech-block in front and to guide the same into its seat in the act of closing the breech. The rear of the obturator is curved, while the face of the breech-block is flat. Consequently when the gun is fired the obturator may yield slightly or rock upon the breech-block as the cup-walls expand outward against their seating, so as to insure an efficient gas-check. The obturator is continued to the rear in the form of a tube T, passing freely through the breech-block and then through the ring of a carrying-strut S, behind which a nut N on the tube unites these parts. The tube T also extends through the front of the obturator, where it is open-ended, and a breech-loading axial powder-tube or inner barrel A protrudes therefrom. The bore of the obturator or its tube is slightly conical near its front end, and a hollow vent piece or plug P, fitted thereto, is coupled at its front end to said axial tube A and provided internally with an axial firing-pin F and an axial hammer-rod H, together with appropriate guides, fast collars, and springs, preferably in the manner shown in Fig. 1. This arrangement of detached firing-pin, hammer-rod, guides, collars, and springs is substantially identical with an arrangement more fully set forth in my specification of an improvement in guns, forming part of a previous application for United States Patent No. 410,320, and need not therefore be described at length in the present specification. The plug P terminates at its rear end in a "rear block" $B^2$, which is a small interrupted-screw breech-block, and the socket into which it screws is conveniently formed within the rear end of said nut N. An interrupted-screw coupling-block $b^2$, Fig. $1^\times$, provided with a rigid pipe-elbow $e$ and a rigid handle $h^2$, is likewise fitted to the rear bore of said nut N for attaching an air-hose $h$ after each discharge of the gun in action, as hereinafter more fully set forth. A cocking-ring C is pivoted directly to the rear end of the hammer-rod H. The breech-block B and rear block $B^2$ are provided with suitable handles, as H' $H^2$, and the carrying-strut S is connected by a transverse horizontal pivot P' with a longitudinally-sliding rest R, working in a suitable guideway G, which is attached to or formed on the gun at its bottom.

In each embodiment of the invention the axial tube A may be either a practice-barrel, as shown in full lines in Fig. 1, and more particularly illustrated by Figs. 2, 2$^a$, 2$^b$, and 3$^a$, or the starting-charge tube of a main-charge cartridge—such as set forth in my specification of an improvement in ammunition, forming part of an allowed application for United States Patent No. 398,386—as shown with the aid of dotted lines at C' in Fig. 1, these dotted lines representing the wooden cushion of such main cartridge chambered for accelerating charges of high explosive and the termination of the tube A at or near its front. In either case the axial tube is loaded with a small central-fire cartridge and then coupled endwise to the plug P, as by the plug and socket bayonet-joint represented in Fig. 1.

When a practice-barrel is used, as illustrated by Figs. 2, 2$^a$, 2$^b$, and 3$^a$, the axial tube A is extended, preferably, to the muzzle of the gun, and provided at its muzzle end with a suitable support, as a collar X, having radial studs fast on the tube and movable therewith within the bore of the gun. After a practice-cartridge is fired the "main fermeture," as it is hereinafter termed, formed by the said breech-block B, obturator O, and tube T, together with its supporting-strut S and rest R and the practice-barrel A, is drawn back horizontally to the position in which such main fermeture is represented in full lines in Fig. 3$^a$. In this position of the latter a space of, say, four inches is afforded between the obturator O and the rear of the gun. Through this space the gunner readily grasps the tube A and uncouples it from the plug P. The main fermeture is then turned back on the pivot P', so as to be out of the way while the cartridge-shell is extracted and a fresh practice-cartridge is introduced. The main fermeture is then restored to its horizontal retracted position, the tube A is again coupled to the plug P, the breech is closed, the gun is sighted, the hammer-rod H is retracted by the cocking-ring C, and upon its release strikes the firing-pin F and the latter fires the practice-cartridge. Practice with the gun may thus be had with little expense for ammunition.

When either gun is being fired with full service-charges, the tube A that is used is a starting-charge tube, as represented with the aid of dotted lines in Fig. 1, and together therewith the "subsidiary fermeture," as it is hereinafter termed, composed of the plug P, the rear block B$^2$, and the firing mechanism, is bodily withdrawn after each discharge before unlocking the main fermeture. The air-hose attachment, Fig. 1$^\times$, is then applied, and air from an adjacent reservoir or blower is driven through the bore of the gun to carry off the smoke. Meanwhile the tube A is detached, the cartridge-shell within it is extracted, a fresh starting-charge cartridge is introduced, and the tube is reattached; or, preferably, an interchangeable tube ready provided with a fresh cartridge is immediately substituted for the detached tube, and the latter is then more deliberately made ready preliminary to the next loading operation. As soon as the gun is free from smoke, the coupling-block $b^2$ is unlocked and the air-hose attachment is removed from the gun. The main fermeture is then drawn back and turned over on the pivot P', as before, the cartridge-shell is removed from the obturator O, and a fresh main cartridge is introduced in its place within the chamber of the obturator, the depth of which accommodates a considerable length of the cartridge, as represented at C' in Fig. 1, as aforesaid, so that the obturator is, in fact, a cartridge-holder. Meanwhile the projectile and wad are adjusted within the breech, the main fermeture is then turned back and thrust into the gun, and the breech-block B is locked. The subsidiary fermeture carrying the loaded starting-charge tube is then inserted, the rear block B$^2$ is locked, and the gun is then ready for firing.

In light guns the breech-block B is worked by a handle H'—such as is represented in Figs. 1, 3, and 3$^a$—carrying a spring-stop S', and the latter comprises a stud, which works in a groove G', cut in the rear end of the gun concentric with the longitudinal axis of the breech-bore. The bottom of this groove is an inclined plane corresponding with the forward travel of the breech-block, and at its termination there is a hole $h'$ to receive the bolt or pin $p$ of the spring-stop S', which projects into the same in the position of the handle H', (indicated by the dotted line $b$ in Fig. 3,) to lock the breech-block when the gun is to be fired. The rear block B$^2$ is turned by means of a bail-shaped handle H$^2$, having in its end portion a bore $k$, Fig. 3, of key-hole shape, through which the rear end of the hammer-rod H slides and coacts with a cocking-lug $c$, Figs. 1 and 3$^a$, on said rod, so that the firing mechanism is cocked by a simple twist of the wrist, when the hammer-rod is retracted by means of the cocking-ring C, said lug being thus disaligned with reference to the groove of said bore. To fire the gun the cocking-ring is struck or pulled laterally, so as to align the lug $c$ with the groove of the bore $k$. Normally the two should be in line when the breech-block B and rear block B$^2$ are both locked until the hammer-rod is pulled and turned, as above.

The unlocked and loosened main fermeture of the light gun is retracted by means of a clevis or ring R', adapted to be readily grasped by the hand, and the supporting-strut S, when turned on the pivot P', is supported in horizontal position by a stop $s$, projecting from the rear end of the rest R and engaging with a notch $n$ in a projection on the strut S, as illustrated in the dotted-line position in Fig. 3$^a$.

In the arrangement for heavier guns (illustrated by Figs. 4, 4$^a$, and 5) the breech-block B is provided with a pair of lever-handles H'. A fixed stud-pin S² projects from the gun near the unlocked position of one of these handles. A pair of toggle-links L² are thereby pivoted and supported at one end, and are provided with a projecting pin P² as their middle pivot. At their other extremity they are coupled to the grip of the adjacent handle H' after the breech-block has been partly turned, and a yoke Y is then engaged with said pin P². (See dotted lines in Fig. 4.) This yoke is attached to a tightening-screw T² of quick pitch, having a lever-handle and working in a fixed nut-projection N² on the gun. When the toggle is straightened, the breech-block is securely locked, and in unlocking it it is loosened so as to be readily turned by the handles H'. In this arrangement for heavier guns the rear block B² is turned by means of a pair of radial handles H², and a distinct "trigger" $t$ in the rear block provides for firing the gun. This trigger is in the form of a radial bolt having a head at its inner end and an eye at its outer end and normally pressed inward by a spiral spring $s'$, Fig. 4ª, which is inclosed and provided with an abutment at its outer end by a screw-cap $c'$. The enlarged rear end of the hammer-rod H is cylindrical, and is guided by a bushing $b'$ in the outer end of the rear block B². The trigger $t$ engages automatically with the shoulder at the front end of said enlarged portion of the hammer-rod when the latter is retracted by means of the cocking-ring C, and the gun is fired by pulling the trigger outward by means of a cord attached thereto. The main fermeture in this arrangement for heavier guns is run into and out of the breech by means of a pair of retracting hand cranks or winches R² through pinions $p²$, meshing with sunken racks $r²$ in the lower edges of a double rest R, this rest being mounted upon rollers $r$, which, together with the shaft of said pinions, have suitable bearings in the sides of the guideway G. The supporting-strut S, when turned back on the pivot P', is sustained in horizontal position by a pair of stops $s$ and notches $n$, each of which is or may be substantially similar to those of the light gun above described. These stops in each gun may be fixedly attached to or formed on the rest R, for example. The breech-block B may be flanged to mask its screw-socket like said rear blocks B², and other like modifications will suggest themselves to those skilled in the art.

I am aware that in the specification filed in pursuance of British Letters Patent No. 4,109, granted in the year 1880 to Andrew Noble, a system of breech mechanism is described in which the bolt securing the obturator to the breech-block is pierced to form a vent-passage communicating with a chamber in the breech-block and in which the said chamber is closed by a vent-block carrying a firing-pin and primer. This device differs essentially from my present invention, inasmuch as when the vent-block is removed the "vent" still remains in place, whereas by my method of construction the vent comes away with the subsidiary fermeture, and free access for the injection of air and for other purposes is opened up to the interior of the gun.

I am also aware that in the specification forming part of United States Letters Patent No. 384,537, granted to Thorston Nordenfelt, a breech mechanism is described in which the fermeture when withdrawn from the gun is supported by a carrier-ring having a projecting arm pivoted on a bolt or stud attached to the gun. In this device the breech-block has a forward and rearward movement through the carrier-ring, and when the latter is revolved round the pivot it removes the breech-block to one side in relation to the axis of the gun, whereas in my invention the carrier-ring moves backward and forward with the breech-block and when rotated on its pivot maintains the breech-block in alignment with the axis of the gun, and thus keeps it protected from the direct fire of the enemy.

I am further aware that in the specification forming part of United States Letters Patent No. 55,762, issued to L. W. Broadwell, a permanently-located gas-ring having a conical or curved periphery is described, and that, as mentioned in such specification previous inventors had devised conical gas-rings which were removable from their seats in the open or loading position of the gun. I do not, therefore, broadly claim a removable obturator having a conical periphery.

Having thus described the said improvements in breech mechanism and attachments for ordnance, I claim as my invention and desire to patent under this specification—

1. In breech mechanism for ordnance, the combination of a main fermeture having a longitudinal passage extending therethrough and a subsidiary fermeture fitted to said passage and comprising a vent-piece removable with the remainder of the subsidiary fermeture from said passage, substantially as hereinbefore specified.

2. The combination, with the main fermeture, of an upright strut connected therewith, a longitudinally-movable rest, and a transverse horizontal pivot connecting said strut and said rest, substantially as hereinbefore specified, whereby said main fermeture is adapted to be moved backward and forward and to be turned into and out of vertical position in alignment with the axis of the gun.

3. In combination with a gun having its breech open at the rear and constructed with a beveled recess in front of the breech-recess and in line with the bore of the gun, a breech-block fitted to said breech-recess, and a deep cup-shaped obturator, which constitutes a cartridge-holder, fitted to said beveled recess and connected with said breech-block so as to move backward and forward therewith, substantially as hereinbefore specified.

4. In breech mechanism for ordnance, the combination, with the gun and a breech-block, of an obturator having a central tube which extends rearwardly through said breech-block and forms a longitudinal passage therein and a subsidiary fermeture fitted to said passage and operating therein, substantially as hereinbefore specified.

5. In breech mechanism for ordnance, the combination, with the gun and a breech-block, of an obturator having a central tube which extends rearwardly through said breech-block and forms a longitudinal passage therein and a central socket which extends forward and opens into the chamber of the gun and forms a continuation of said longitudinal passage, and a subsidiary fermeture fitted to said passage and operating therein, substantially as hereinbefore specified.

6. In breech mechanism for ordnance, the combination, with a breech-block, of an obturator having a central tube which extends rearwardly through said breech-block, a coupling-nut applied to the rear end of said tube and extending beyond its extremity, and a subsidiary fermeture comprising a rear block fitted to the rear end of said nut, substantially as hereinbefore specified.

7. In breech mechanism for ordnance, the combination of an obturator and a breech-block having a longitudinal passage through them, a coupling-nut at the rear end of said passage, and a subsidiary fermeture and a hose attachment interchangeably fitted to said nut, substantially as hereinbefore specified.

8. In breech mechanism for ordnance, the combination of an obturator and a breech-block having a longitudinal passage through them, with a subsidiary fermeture which operates in such passage, carries a firing-pin and its appurtenances, and terminates in front in a vent-piece removable rearwardly with the remainder of the subsidiary fermeture and having a socket which opens into the chamber of the gun, substantially as hereinbefore specified.

9. In breech mechanism for ordnance, the combination of an obturator and a breech-block having a longitudinal passage through them, with a subsidiary fermeture which operates in such passage, carries a firing-pin and its appurtenances, and terminates in front in a vent-piece removable rearwardly with the remainder of the subsidiary fermeture and having a socket which opens into the chamber of the gun, and an axial tube coupled endwise to such socket, substantially as hereinbefore specified.

10. In breech mechanism for ordnance, the combination, with an obturator and a breech-block having a central longitudinal passage through them, of a subsidiary fermeture operating in such passage and comprising a plug which carries the firing-pin, and an axial tube coupled endwise to said plug by a plug and socket bayonet-joint, substantially as hereinbefore specified.

11. In breech mechanism for ordnance, the combination, with an obturator and a breech-block having a central longitudinal passage through them, of a subsidiary fermeture operating in such passage and comprising a plug which carries the firing-pin, and an axial tube extending through the bore of the gun and provided with a suitable support at its muzzle for use as a practice-barrel, substantially as hereinbefore specified.

12. In breech mechanism for ordnance, the combination, with an interrupted-screw breech-block, of an operating-handle having a spring-stop which comprises a projecting stud and a spring-projected pin contained in the said stud, and a groove in the face of the rear end of the gun, having its bottom inclined to correspond with the endwise travel of the breech-block during the locking operation and provided with a locking-hole to receive said pin, substantially as hereinbefore specified.

13. In breech mechanism for ordnance having main and subsidiary fermetures, the combination, with the latter, of a bail-shaped handle having a bore of key-hole shape, and an axial hammer-rod guided by said bore and having a lateral lug fitted to its groove, and a cocking-ring attached to the rear end of said rod, substantially as hereinbefore specified.

14. In breech mechanism for ordnance, the combination, with an obturator and a breech-block, of a supporting-strut, a sliding rest, a guide for the latter, a pivot connecting said strut and rest, and a retracting-clevis attached to said pivot, substantially as hereinbefore specified.

15. In breech mechanism for ordnance, the combination, with an obturator and a breech-block, of a supporting-strut, a sliding rest, a guide for the latter, and a stop attached to the rest for sustaining the strut in horizontal position, substantially as hereinbefore specified.

STEPHEN H. EMMENS.

Witnesses:
NEWTON W. EMMENS,
SAML. B. HAMBURG.